United States Patent
Park et al.

(10) Patent No.: US 8,924,731 B2
(45) Date of Patent: Dec. 30, 2014

(54) SECURE SIGNING METHOD, SECURE AUTHENTICATION METHOD AND IPTV SYSTEM

(75) Inventors: Il Gon Park, Seoul (KR); Sung Hyun Cho, Seoul (KR); Min Gyu Chung, Seoul (KR); Kumar K. Kiran, Seoul (KR); Man Soo Jeong, Seoul (KR); Koo Yong Pak, Seoul (KR)

(73) Assignee: LG Electronics Inc., Seoul (KR)

( * ) Notice: Subject to any disclaimer, the term of this patent is extended or adjusted under 35 U.S.C. 154(b) by 797 days.

(21) Appl. No.: 12/677,552

(22) PCT Filed: Sep. 11, 2008

(86) PCT No.: PCT/KR2008/005393
§ 371 (c)(1),
(2), (4) Date: Mar. 11, 2010

(87) PCT Pub. No.: WO2009/035283
PCT Pub. Date: Mar. 19, 2009

(65) Prior Publication Data
US 2010/0211793 A1    Aug. 19, 2010

Related U.S. Application Data

(60) Provisional application No. 60/971,548, filed on Sep. 11, 2007, provisional application No. 60/973,751,
(Continued)

(51) Int. Cl.
*H04L 29/06* (2006.01)
*H04N 21/2389* (2011.01)
(Continued)

(52) U.S. Cl.
CPC ..... *H04N 21/8358* (2013.01); *H04N 21/23892* (2013.01);
(Continued)

(58) Field of Classification Search
USPC ................................... 713/176, 181
See application file for complete search history.

(56) References Cited

U.S. PATENT DOCUMENTS 6,009,526 A * 12/1999 Choi ............................. 726/1
2002/0023217 A1 * 2/2002 Wheeler et al. ............... 713/171
(Continued)

FOREIGN PATENT DOCUMENTS

| CN | 1791215 | * | 6/2006 | ............... H04N 7/24 |
| CN | 1868189 A | | 11/2006 | |

(Continued)

OTHER PUBLICATIONS

European Search Report dated Jan. 12, 2012 for Application No. EP08830529.7, 8 pages.

(Continued)

*Primary Examiner* — Michael Pyzocha
(74) *Attorney, Agent, or Firm* — Fish & Richardson P.C.

(57) ABSTRACT

A secure signing method, a secure authentication method, and an IPTV system are disclosed. The secure signing method includes preparing digital signature header fields and setting an attribute, calculating a hash digest of content using a hashing algorithm, storing the calculated hash value in a message digest field of the digital signature header, encrypting the message digest using a secret key and inserting the encrypted message digest in a signature field of the digital signature header, and associating the digital signature header with the content by prefixing the digital signature header to the content. The secure authentication method includes checking whether a format and value of a digital signature header of content are appropriate, calculating a hash digest of the content using a hashing algorithm, comparing the calculated hash value with a message digest field of the digital signature header, decrypting the hash value of the signature field of the digital signature header using a public key extracted from a certificate field, and comparing the decrypted hash value with the message digest.

8 Claims, 12 Drawing Sheets

| SSL | Execution environment | Definition |
|---|---|---|
| 0 | Non-Secured | -No Authentication and no integrity check |
| 1 | Non-Secured | -Authentication and integrity are verified by software |
| 2 | Non-Secured | -Authentication and integrity are verified by hardware |
| 3 | Secured | -Authentication and integrity are verified by software |
| 4 | Secured | -Authentication and integrity are verified by hardware |

SSLT

Related U.S. Application Data filed on Sep. 19, 2007, provisional application No. 60/975,816, filed on Sep. 28, 2007, provisional application No. 60/978,142, filed on Oct. 8, 2007, provisional application No. 60/980,452, filed on Oct. 17, 2007, provisional application No. 60/988,808, filed on Nov. 18, 2007.

(51) Int. Cl.
| | |
|---|---|
| *H04N 21/254* | (2011.01) |
| *H04N 7/16* | (2011.01) |
| *H04N 21/4623* | (2011.01) |
| *H04N 21/61* | (2011.01) |
| *H04N 21/8358* | (2011.01) |

(52) U.S. Cl.
CPC .......... *H04N 21/2541* (2013.01); *H04N 7/162* (2013.01); *H04N 21/4623* (2013.01); *H04N 21/6125* (2013.01); *H04N 21/6175* (2013.01)
USPC .......................................... 713/181; 713/176

(56) References Cited

U.S. PATENT DOCUMENTS

| | | | | |
|---|---|---|---|---|
| 2002/0108041 | A1* | 8/2002 | Watanabe et al. | 713/175 |
| 2003/0131235 | A1* | 7/2003 | Wheeler et al. | 713/168 |
| 2003/0159037 | A1 | 8/2003 | Taki et al. | |
| 2003/0172122 | A1* | 9/2003 | Little et al. | 709/207 |
| 2004/0054912 | A1 | 3/2004 | Adent et al. | |
| 2004/0117626 | A1* | 6/2004 | Andreasyan | 713/175 |
| 2004/0255114 | A1 | 12/2004 | Lee et al. | |
| 2005/0039016 | A1 | 2/2005 | Aissi et al. | |
| 2005/0039034 | A1 | 2/2005 | Doyle et al. | |
| 2006/0117391 | A1 | 6/2006 | Kim | |
| 2008/0005349 | A1* | 1/2008 | Li et al. | 709/231 |
| 2008/0301745 | A1* | 12/2008 | Liu et al. | 725/110 |
| 2011/0029769 | A1 | 2/2011 | Aissi et al. | |

FOREIGN PATENT DOCUMENTS

| | | |
|---|---|---|
| JP | 10-215245 A | 8/1998 |
| JP | 2003-284024 A | 10/2003 |
| JP | 2004-102951 A | 4/2004 |
| JP | 2005-137011 A | 5/2005 |
| JP | 2007-135062 A | 5/2007 |
| JP | 2007-525755 A | 9/2007 |
| KR | 10-2006-0113869 A | 11/2006 |
| WO | WO 2006/049420 A1 | 6/2005 |
| WO | WO 2005/076576 A2 | 8/2005 |
| WO | WO 2008/048034 A1 | 4/2008 |

OTHER PUBLICATIONS

Broadband Forum, Technical Report, "TR-069 CPE WAN Management Protocol V1.1, Version: Issue 1 Amendment 1", Nov. 30, 2006, XP002550467, pp. 1-138.

B. Kakusju, RSA Laboratories, East, "PKCS #7: Cryptographic Message Syntax, Version 1.5", Mar. 1, 1998, XP015008099, pp. 1-34.

DVB Organization: "cm-iptv0309.doc", 1-10 DVB, Digital Video Broadcasting, C/O EBU—A 17A Ancienne Route—CH-1218 Grand Saconnex, Geneva—Switzerland. Apr. 18, 2007, XP017827456, pp. 1-56.

International Search Report dated Apr. 6, 2009 for Application No. PCT/KR2008/005393, 2 pages.

Chinese Office Action dated Sep. 7, 2011 for Application No. 200880105815.9, with English translation, 16 pages.

Japanese Office Action dated Jul. 5, 2012 for Application No. 2010-524784, with English Translation, 11 pages.

Nobuhiro Suemasa, "Protect Employees From Phishing/Fraud E-mail! Technical Threats and Countermeasures of Worsening Spam", N + I Network, Japan, Softbank Publishing Inc., Jul. 1, 2005, vol. 5, No. 7, pp. 94-111, Partial English Translation.

"Electronic Documents Long-Term Preservation Handbook", Japan, Next Generation Electronic Commerce Promotion Council, Mar. 2007, a first printing of a first edition, pp. 189-193, Partial English Translation.

Kunitake Kaneko, et al., "IPTV Service on Session Layer Architecture", Technical Report of IEICE, Japan, Institute of Electronics, Information and Communication Engineers, Feb. 23, 2006, vol. 105, No. 624, pp. 55-60, English Abstract.

Ken Kerpez, et al., "IPTV Service Assurance", IEEE Communications Magazine, Sep. 2006, vol. 44, Issue: 9, pp. 166-172.

\* cited by examiner

Fig. 3

| Field | Description |
|---|---|
| Signature{ | |
|    ContentInfo | { 1.2.840.113549.1.9.16.1.6 } |
|      ContentType | SignedData { 1.2.840.113549.1.7.2 } |
|    SignedData() | *See* Table 2 |
| }end Signature | |
| SignedContent { | |
|    Content() | Sequence of Octets for Software image or message. |
| }end SignedContent | |

Fig. 4

| Field | Description |
|---|---|
| `SignedData{` | |
|     `version` | |
|     `digestAlgorithms` | |
|     `encapContentInfo` | |
|         `ContentType` | Data { 1.2.840.113549.1.7.1 }<br>The Content () is appended to the ISS/A Digital Signature per "External Signature" method defined in RFC-3852. |
|     `certificates {` | |
|         `ContentSignerCVC` | Required |
|         `CVC CA` | Optional |
|     `} end certificates` | |
|     `crls` | shall NOT be used in this structure |
|     `signerInfo{` | |
|         `version` | version=1 |
|         `sid` | |
|             `issuerName` | Refer to ATIS-0800015 |
|             `serialNumber` | Refer to ATIS-0800015 |
|         `digestAlgorithm` | SHA-1 { 1.3.14.3.2.26 } shall be supported, SHA-256 { 2.16.840.1.101.3.4.2.1 } SHOULD be supported, and others not precluded |
|         `signedAttrs` | |
|             `contentType` | { 1.2.840.113549.1.9.3 } (required)<br>(always Data { 1.2.840.113549.1.7.1 }) |
|             `messageDigest` | { 1.2.840.113549.1.9.4 } (required) |
|             `signingTime` | { 1.2.840.113549.1.9.5 } (optional)<br>UTC Time (GMT), YYMMDDHHMMSSZ |
|         `signatureAlgorithm` | SHA-1 with RSA Encryption<br>{ 1.2.840.113549.1.1.5 } shall be supported,<br>SHA-256 with RSA Encryption<br>{ 1.2.840.113549.1.1.11 }SHOULD be supported, and others not precluded |
|         `signature` | |
|         `unsignedAttrs` | (optional) |
|     `} end signerInfo` | |
| `}end SignedData` | |

Fig. 7

| SSL | Execution environment | Definition |
|---|---|---|
| 0 | Non-Secured | -No Authentication and no integrity check |
| 1 | Non-Secured | -Authentication and integrity are verified by software |
| 2 | Non-Secured | -Authentication and integrity are verified by hardware |
| 3 | Secured | -Authentication and integrity are verified by software |
| 4 | Secured | -Authentication and integrity are verified by hardware |

SSLT

SECURE SIGNING METHOD, SECURE AUTHENTICATION METHOD AND IPTV SYSTEM

TECHNICAL FIELD

The present invention relates to a secure signing method, a secure authentication method, and an IPTV system, and more particularly, to a secure technology and a secure technology based system, which enable a signing process and an authentication process to be executed conveniently at the time of secure download or secure transfer of messages.

BACKGROUND ART

In recent years, as digital broadcast environment is constructed and the demand for a high picture quality and a variety of supplementary services increases rapidly, digital broadcast service has been commercialized. Digital broadcast service can provide a high quality of service, which could not be provided in existing analog broadcast service.

In particular, Internet protocol television (IPTV) service that provides broadcast service over an IP network can not only provide a high picture quality of broadcast content, but enables bidirectional service, so it enables a user to actively select the type, audience time, etc. of a viewing program.

IPTV service can also provide a variety of supplementary services, for example, Internet search, home shopping, and on-line game in conjunction with broadcast based on this bidirectionality.

For this IPTV service, a service system and a user system may be required. The service system can be provided with various contents from a content provider, and it can generate guide information, including a service content list, a broadcast schedule, preview, etc., for example, electronic program guide (EPG), interactive program guide (IPG), content program guide (CPG), and so on and provide it to the user system over an IP network.

The user system is equipped with an IPTV device (for example, an IPTV set-top box), etc. The user system can display guide information provided from the service provider and request content or service, which is selected by a user, from the service system. Meanwhile, the user system can include a user domain. Content on the user side, which is received by the IPTV device, can be shared by devices within the user domain, for example, home network devices.

In order to stably operate this IPTV system, there is necessarily required a security system which can safely protect IPTV service related content, for example, multi-media content, DRM codes, software, message, etc. from illegal acts when downloading them onto a user system. The security system must be able to define a signature structure, a certificate structure, etc., which are used in authentication, and present an efficient signing process and authentication process so as to increase rapidness and security and therefore guarantee reliability of IPTV service. Accordingly, there is an urgent need for technical development of a corresponding field.

DISCLOSURE OF INVENTION

Technical Problem

It is an object of the present invention to provide a secure signing method and a secure authentication method, which can guarantee the security of content at the time of secure download and transfer of secure messages, etc. to a device, and a system based thereon.

Technical Solution

To achieve the above object, an aspect of the present invention provides a secure signing method. The secure signing method can include the steps of preparing digital signature header fields and setting an attribute; calculating a hash digest of content using a hashing algorithm; storing the calculated hash value in a message digest field of the digital signature header; encrypting the message digest using a secret key and putting the encrypted message digest in a signature field of the digital signature header; and associating the digital signature header with the content by prefixing the digital signature header to the content. The hashing algorithm can be identified within a digest algorithm field of the digital signature header.

The secure signing method may further include the step of putting a certificate of a signer in a certificate field of the digital signature header field. The signer's certificate can include the signer's identification information, a public key that can be used to decrypt the encrypted message digest, and a digital signature a high level of a trusted certificate authority.

The secure signing method may further include the step of putting a certificate of the certificate authority, which authenticates the signer's certificate, in the certificate field of the digital signature header field.

To achieve the above object, another aspect of the present invention provides a secure authentication method. The secure authentication method can include the steps of checking whether a format and value of a digital signature header of content are appropriate; calculating a hash digest of the content using a hashing algorithm; comparing the calculated hash value with a message digest field of the digital signature header; decrypting the hash value of the signature field of the digital signature header using a public key extracted from a certificate field; and comparing the decrypted hash value with the message digest. The hashing algorithm can be identified within a digest algorithm field of the digital signature header.

To achieve the above object, still another aspect of the present invention provides an IPTV system. The IPTV system can includes a server side system calculating a hash digest of content, storing the calculated hash value in a message digest field of a digital signature header, encrypting the message digest using a secret key, putting the encrypted message digest in a signature field of the digital signature header, prefixing the digital signature header to the content, and transferring the content to which the digital signature header is prefixed; and an IPTV receiving device performing an authentication process of receiving the digital signature header, checking whether a format and value of the digital signature header are appropriate, calculating a hash digest of the content, comparing the calculated hash value with the message digest field of the digital signature header, and decrypting the hash value of the signature field of the digital signature header using a public key extracted from a certificate field.

The server side system can put a signer's certificate in the certificate field, and the IPTV receiving device can extract the public key from the signer's certificate in the certificate field.

The authentication process can be performed by a native security solution of the IPTV receiving device. The IPTV receiving device can be associated with a security solution level in which a security characteristic of the IPTV receiving device is graded according to preset criterion.

Advantageous Effects

As described above, in accordance with the present invention, a security solution authentication process can be provided at the time of secure download or transfer of secure messages. In particular, the present invention can be easily applied to enable secure download of executable software, secure download of DRM codes, secure transfer of configuration files or one-time commands, secure transfer of EAS messages, and the like.

BRIEF DESCRIPTION OF THE DRAWINGS

FIG. 3 is an exemplary view showing a table representing the format of a digital signature and signed content;

FIG. 4 is an exemplary view showing a table representing a field structure of 'signed data' shown in FIG. 3;

FIG. 7 is an exemplary view showing a security solution level table, which is a criterion for designating a security solution level of a device;

DESCRIPTION OF REFERENCE NUMERALS OF PRINCIPAL ELEMENTS IN THE DRAWINGS

S1: signing process
S2: authentication process

MODE FOR THE INVENTION

Hereinafter, the present invention will be described in detail in connection with preferred embodiments with reference to the accompanying drawings in order for those skilled in the art to be able to implement the invention. In the preferred embodiments of the present invention, specific technical terminologies are used for clarity of the content. However, it is to be understood that the present invention is not limited to specific selected terminologies and each specific terminology includes all technical synonyms operating in a similar way in order to accomplish a similar object.

Figure 1:
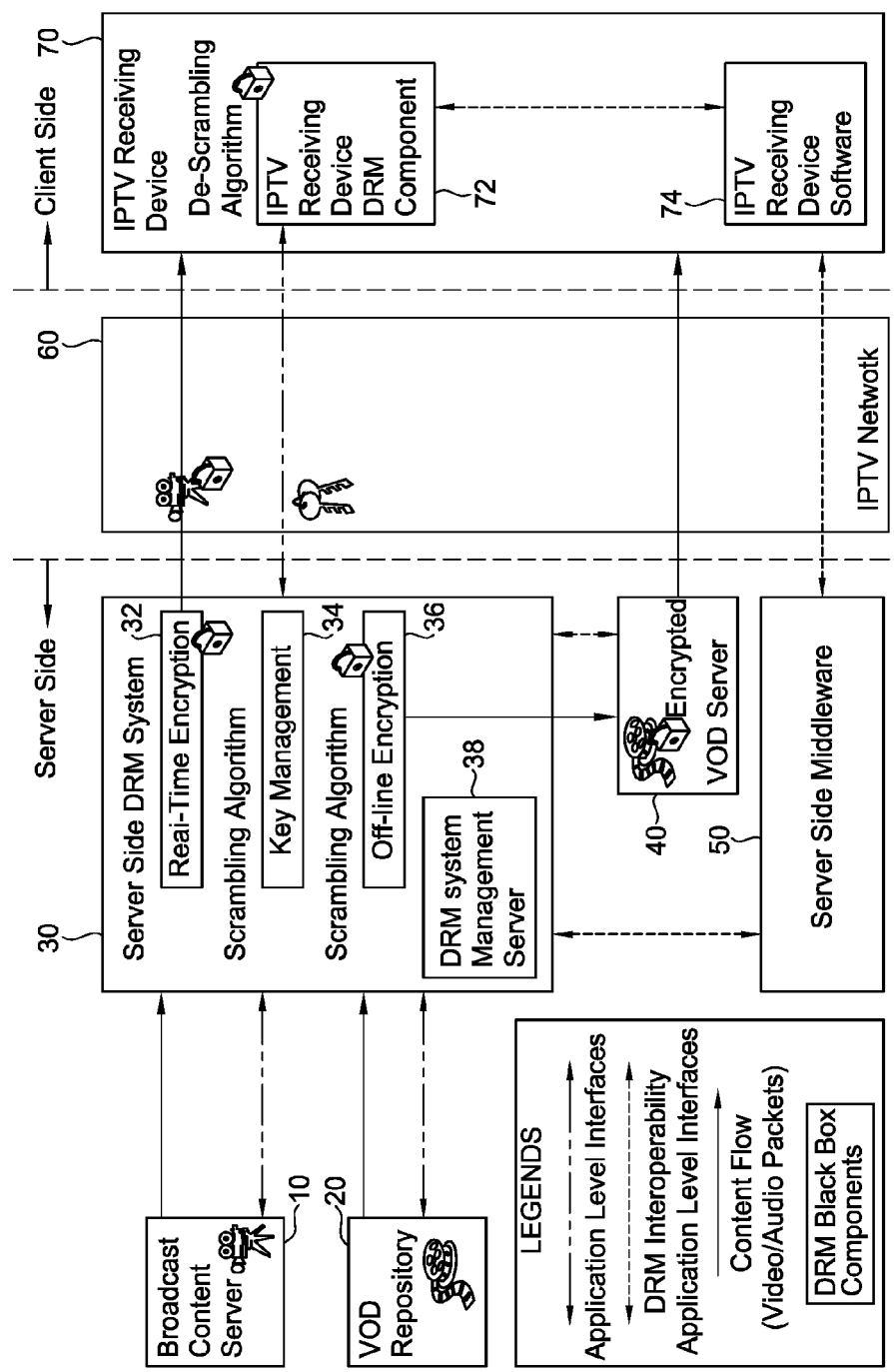
FIG. 1 is a block diagram showing digital rights management (DRM) components for IPTV service.

FIG. 1 is a block diagram showing digital rights management (DRM) components for IPTV service. This drawing mostly shows components necessary for security in the construction of an IPTV system for providing IPTV service.

As shown in FIG. 1, a server side DRM system 30 receives content from a broadcast content server 10 or a video on demand (VOD) repository 20. The server side DRM system 30 may include a real-time encryption module 32, a key management module 34, an off-line encryption module 36, a DRM system management server 38 and so on.

The real-time encryption module 32 can encrypt media content provided from the broadcast content server 10 or the VOD repository 20 in real-time using a key provided from the key management module 34 and output a stream of the encrypted real-time content. The content stream output from the real-time encryption module 32 is transferred to an IPTV receiving device 70. The real-time encryption module 32 can interface with the broadcast content server 10 or the VOD repository 20 through an application level and operate in conjunction with components of the server side DRM system 30, if appropriate.

The off-line encryption module 36 receives media content, which will be stored in a VOD server 40, from the broadcast content server 10 or the VOD repository 20 for a specific time period, encrypts the received media content and provides the encrypted content to the VOD server 40. The off-line encryption module 36 is connected to an input port of the VOD server 40. The off-line encryption module 36 can interface with the broadcast content server 10 or the VOD repository 20 through an application level and operate in conjunction with the components of the server side DRM system 30, if appropriate.

The key management module 34 can provide an appropriate encryption key to the real-time encryption module 32, the off-line encryption module 36 or the IPTV receiving device 70 and manage the encryption key. The stream from the key management module 34 can be transferred to the IPTV receiving device 70 and interface with the IPTV receiving device 70 through an application level.

The DRM system management server 38 functions as a central core of a DRM solution. For example, the DRM system management server 38 can properly control sub-elements of the server side DRM system 30, for example, the real-time encryption module 32, the key management module 34, the off-line encryption module 36, etc. and operate in conjunction with a server side middleware 50. Further, the DRM system management server 38 can provide secure services, for example, authentication, etc. to the components of the server side DRM system 30, an IPTV receiving device DRM component 72 of the IPTV receiving device 70 and the like.

The VOD server 40 can store encrypted content and provide encrypted content according to an instruction of the server side middleware 50. An IPTV network 60 provides a route through which a variety of packet streams transmitted from the server side DRM system 30 or the VOD server 40 can be adequately transferred to the IPTV receiving device 70 according to a corresponding IP address.

The IPTV receiving device 70 can be provided on the client side. The IPTV receiving device 70 provides corresponding functions through which a user can view media content whose rights are assigned to the user (for example, rights can be obtained through purchase of media content, etc.) using the user's viewing device, for example, TV, etc. The IPTV receiving device 70 is connected to the IP network 60 and can process, play or store encrypted content received from the server side DRM system 30 or the VOD server 40. The IPTV receiving device 70 may also redistribute the encrypted content to a device of a user domain, which is constructed on the basis of a home network, etc., if needed.

The IPTV receiving device 70 can include the IPTV receiving device DRM component 72 performing functions pertinent to the protection of content, an IPTV receiving device software 74 performing functions pertinent to the use of content, and so on. The IPTV receiving device 70 can be, for example, an IPTV set-top box or a network device equipped with a function corresponding to an IPTV set-top box.

Meanwhile, the server side can transmit various data related to secure download or secure messages to the IPTV receiving device 70. In order to transmit the data, security solution authentication is required. Data requiring security solution authentication can be largely classified into non-persistent data and persistent data.

The non-persistent data may refer to data used only during a reception time where the data is received by the IPTV receiving device 70. The security solution authentication is required in secure transport of an emergency alert system (EAS) message, secure transport of one-time commands, end-to-end communication, and so on, which are the non-persistent data. Meanwhile, the persistent data may refer to data, which is persistent within the IPTV receiving device 70 even after a reception time. The security solution authentication is required in secure download of executable software, secure download of DRM codes, secure transport of configuration files, update of a certificate hierarchy, and so on, which are the persistent data.

A security solution authentication procedure necessarily required for the secure download or transmission of the secure message is described below.

Figure 2:
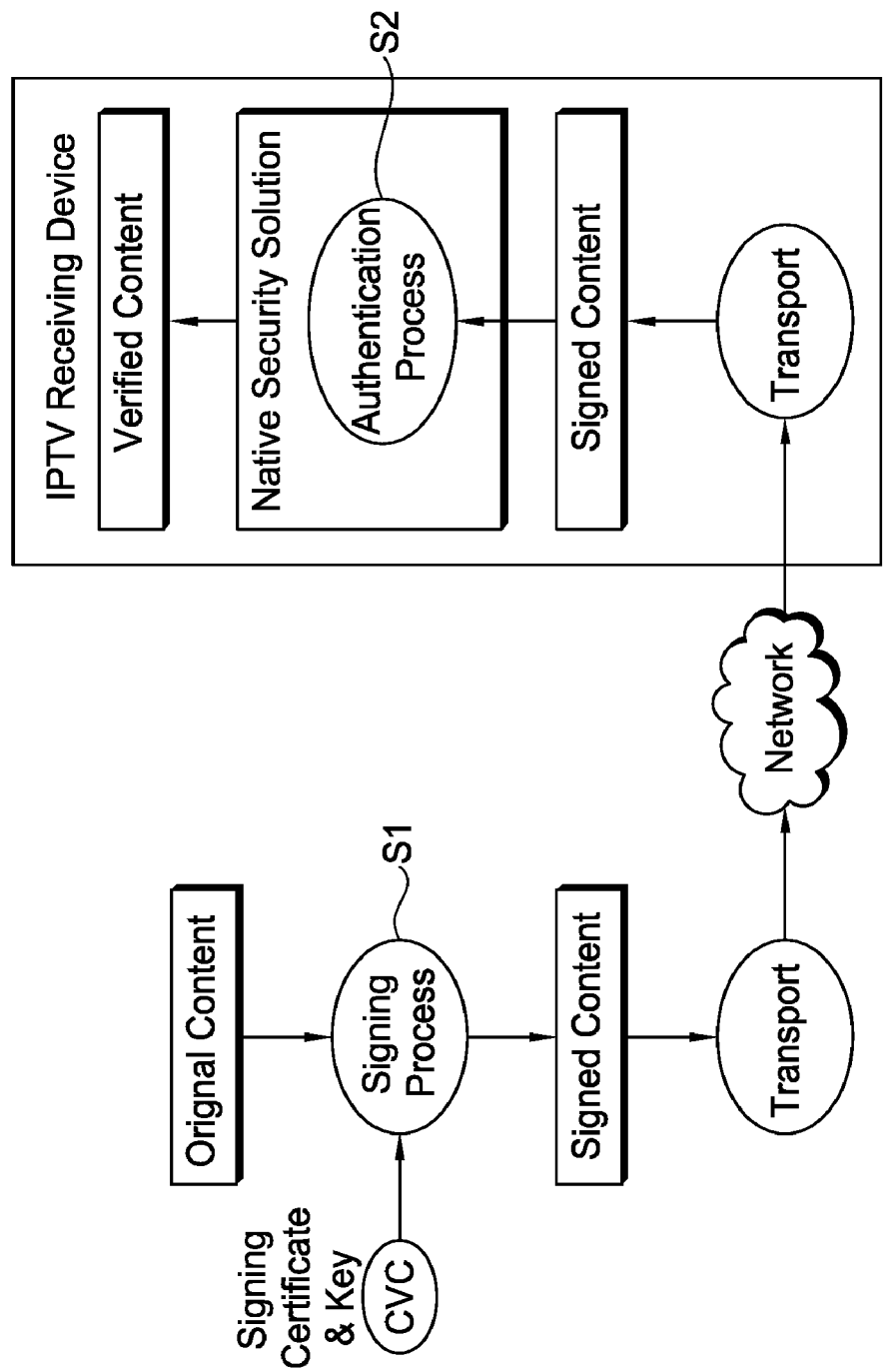
FIG. 2 is an exemplary view illustrating a security solution authentication process in an IPTV system.

FIG. 2 is an exemplary view illustrating a security solution authentication process in an IPTV system.

As shown in FIG. 2, the security solution authentication process includes a signing process (step: S1) and an authentication process (step: S2). The signing process (step: S1) can be performed in a specific system of the server side, for example, the server side DRM system, etc. The authentication process (step: S2) can be performed in a specific element of the IPTV receiving device, for example, a native security solution, etc.

The native security solution may be provided in the IPTV receiving device in the form of hardware, software, or mixed hardware and software on a manufacturing time of the IPTV receiving device. The native security solution can perform an authentication process for security solution authentication, integrity checking and the like.

In order to transmit content to the IPTV receiving device, the server side executes the signing process (step: S1) of associating a digital signature header with original content to be transported and transfers the signed content to the IPTV receiving device over an IP network. The IPTV receiving device can receive the signed content and execute the authentication process (step: S2) in order to verify the content.

The content can be software, secure messages, etc., which are securely transported or may be non-persistent data or persistent data. For example, security solution authentication shown in FIG. 2 can be performed in secure transport of an EAS message, secure transport of one-time commands, end-to-end communication, secure download of executable software, secure download of DRM codes, secure transport of configuration files, update of a certificate hierarchy, and so on.

In the signing process (step: S1) and the authentication process (step: S2), a key pair, which is mathematically associated with each other, may be used. For example, a secret private key can be used on a signing time where the signing process (step: S1) is performed, and a public key can be used on an authentication time where the authentication process (step: S2). A hash digest, i.e., a hash value of content can be calculated on the signing time and the authentication time. On the signing time, a calculated hash value is encrypted using a private key and inserted as a part of a digital signature. This can be decrypted using a private key on the authentication time and compared with a hash, which is newly calculated on the authentication time.

Meanwhile, an authorized signer can be assigned a certificate, including a public key, identification information, a digital signature signed by a trusted certificate authority of an upper level, etc., from a specific entity. The certificate of the signer can be included in a digital signature header at the time of the signing process (step: S1).

FIG. 3 is an exemplary view showing a table representing the format of a digital signature and signed content.

As shown in FIG. 3, a digital signature 'signature{ }' is prefixed to a signed content as a header. The digital signature 'signature{ }' can include fields, 'content info', 'content type', and 'signed data', which respectively represent content information, a content type, and signed data. Here, the 'signed data' field will be described in detail later on with reference to FIG. 4.

A signed content 'signed content{ }' can include a 'content( )' field in which content is inserted. A digitally signed software image or message can be inserted in the 'content( )' field. For example, the 'content( )' field can include an 8-bit configuration (octet) for a software image or message. The signed content must be outside a digital signature and appended to the digital signature.

FIG. 4 is an exemplary view showing a table representing a field structure of the 'signed data' shown in FIG. 3.

As shown in FIG. 4, the signed data 'signed data' field can include a 'certificates{ }' field for putting in a certificate of a signer, a 'signerinfo{ }' field for putting in signer information, and so on.

The 'certificates { }' field includes a certificate of a signer appropriate for content. The signer's certificate can be inserted in a 'contentsignerCVC' field within the 'certificated{ }' field. The 'certificated{ }' field may also include a certificate authority certificate, which has authorized a signer's certificate, as an option. The certificate authority certificate can be inserted in a 'CVD CA' field within the 'certificated{ }' field.

The 'signerinfo{ }' field can include a 'version' field in which version information is inserted, a 'sid' field including identification information of a signer, a 'digestAlgorithms' field in which information of a hashing algorithm used to calculate content's hash digest is inserted, a 'signedAttrs' field in which information related to a signed attribute is inserted, a 'signatureAlgorithm' field in which signature algorithm related information is inserted, a 'signature' field in which a signature is inserted, and so on. The 'signedAttrs' field includes a 'content type' field in which content type information is inserted and a 'messageDigest' field for storing a calculated hash value. The 'signedAttrs' field may further include a 'signingTime' field in which signing time information is inserted, and so on. The 'messageDigest' field can be encrypted using a private key and then stored in the 'signature' field.

Figure 5:
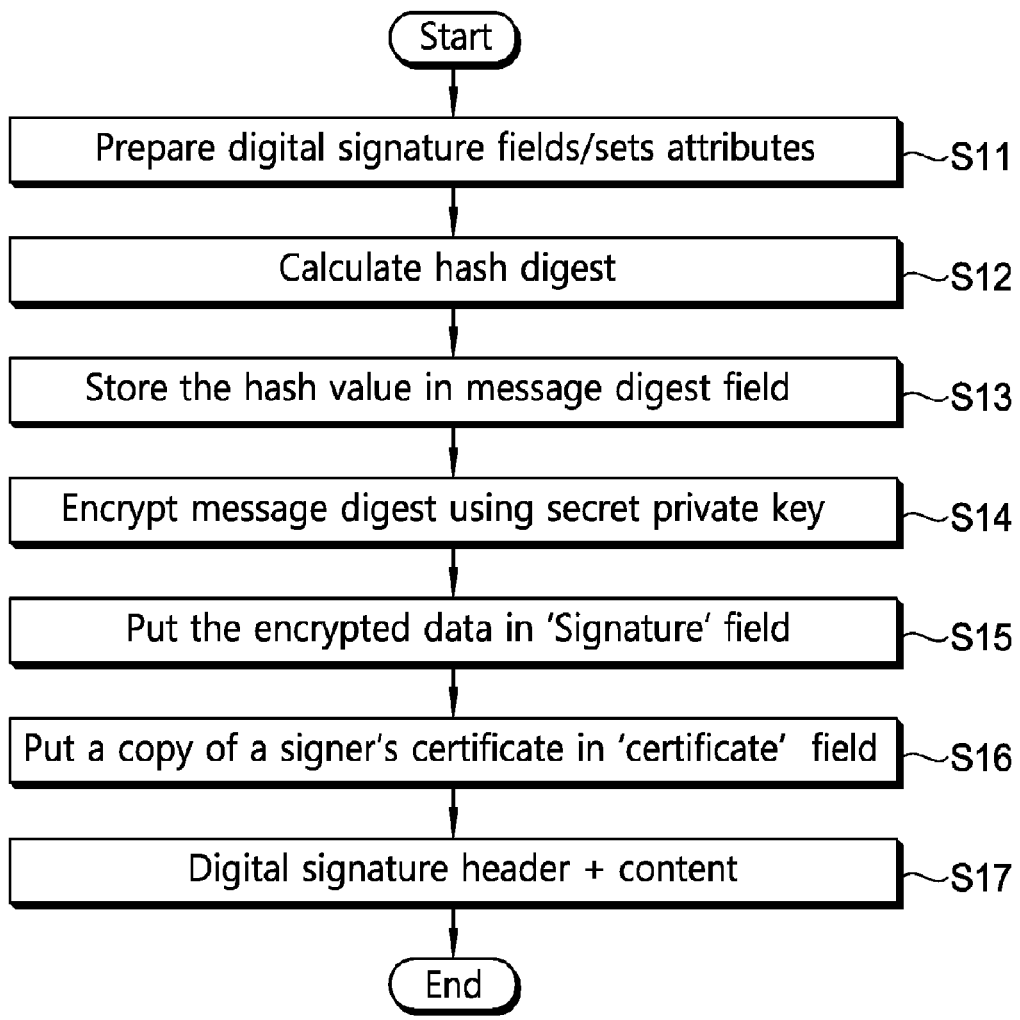
FIG. 5 is a flowchart showing a signing process of the security solution authentication process shown in FIG. 2.

FIG. 5 is a flowchart showing the signing process (step: S1) of the security solution authentication process shown in FIG. 2.

As shown in FIG. 5, the signing process can include generating a digital signature prefixed to a signed content as a header. At this time, a signer must own a private key, a public key certificate issued by a certificate authority and the like.

The signing process can be performed in a specific system of the server side. When the signing process is initiated, fields of a digital signature, which will be appended to content as a header, are prepared, and attributes of the fields are set as in the table shown in FIG. 4 (step: S11).

A hash digest of the content is then calculated. For example, a hash digest covering 'signedAttrs' and 'content( )' can be calculated (step: S12). At this time, a hashing algorithm used to calculate the hash digest can be identified within the 'digestAlgorithms' field of the 'signerinfo' field. After the hash digest is calculated, the calculated hash value (i.e., the hash digest) is stored in a message digest field, i.e., the 'messageDigest' field within the 'signerinfo' field (step: S13).

Thereafter, the contents of the message digest field 'messageDigest' are encrypted using a secret private key (step: S14) and then inserted in the 'signature' field (step: S15). Further, a copy of the certificate of the signer is inserted in the certificate field 'certificates{ }' (step: S16). The signer's certificate includes a public key that can be used in the authentication process. Meanwhile, a certificate authority certificate may be further included in the 'certificates { }' field. The signer's certificate may be linked to a trusted management hierarchy.

Next, the digital signature header generated through the above process is prefixed to the content 'content( )' and added up to have a format such as the table shown in FIG. 3 (step: S17).

The signed content to which the digital signature header is prefixed is transported from the server side to the IPTV receiving device over a communication network. The IPTV receiving device can receive the signed content. Accordingly, the authentication process of the security solution authentication process can be performed.

Figure 6:
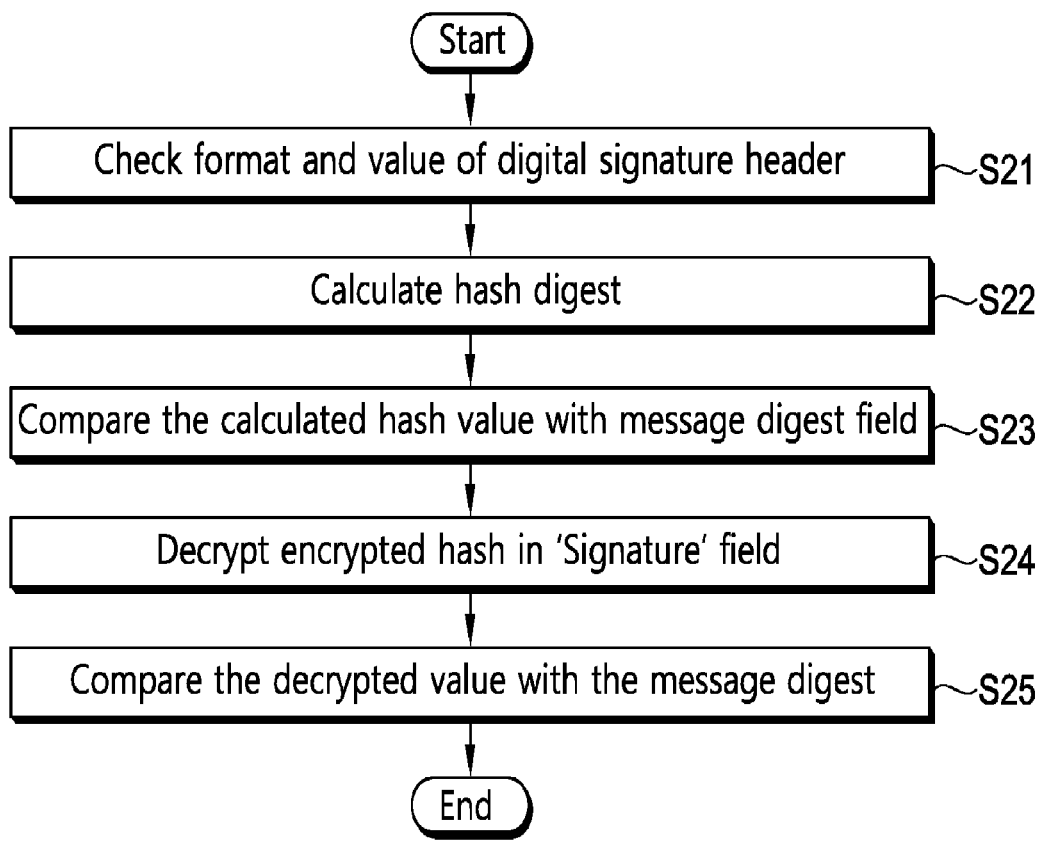
FIG. 6 is a flowchart showing an authentication process of the security solution authentication process shown in FIG. 2.

FIG. 6 is a flowchart showing the authentication process (step: S2) of the security solution authentication process shown in FIG. 2.

As shown in FIG. 6, the authentication process can include a process of checking a digital signature header received, a process of comparing a hash value calculated on a signing time and a hash value calculated based on data of the digital signature header in order to determine whether they are identical to each other, and so on. This authentication process can be performed by a native security solution within the IPTV receiving device.

When the authentication process is initiated, the IPTV receiving device can check whether a digital signature, which is prefixed to a signed content as a header, has a normal format as compared with the contents described in the table of FIG. 4 (step: S21). For example, the IPTV receiving device can perform integrity check on the digital signature header of the signed content, and so on.

The IPTV receiving device then calculates a hash digest of the content (step: S22). For example, the IPTV receiving device can calculate a hash digest covering the 'signedAttrs' and 'content( )'. At this time, a hashing algorithm used to calculate the hash digest can be identified within the 'digestAlgorithms' field of the 'signerinfo' field. After the hash digest is calculated, the IPTV receiving device can compare the calculated hash value (i.e., the hash digest) with a message digest field, i.e., 'messageDigest' within the 'signerinfo' field (step: S23).

Next, the IPTV receiving device can decrypt the encrypted hash (i.e., the encrypted 'messageDigest'), which has been inserted in the 'signature' field of the digital signature, using a public key extractable from the 'certificates' field (step: S24) and compare a decrypted value with a message digest field, i.e., 'messageDigest' within the 'signerinfo' field (step: S25). For example, the IPTV receiving device can extract an encrypted hash from the 'signature' field, extract a public key, included in the signer's certificate, from the 'certificates' field, decrypt the extracted encrypted value using the extracted public key, and compare the decrypted value with 'messageDigest'. The signer's certificate inserted in the 'certificates' field may be linked to a trusted management hierarchy.

If, as a result of the comparison, the decrypted value differs from the calculated hash value or the decrypted hash value 'messageDigest', the IPTV receiving device can generate authentication error. In this case, the IPTV receiving device may transmit an error message, a re-transmission request message, etc. to the server side.

Meanwhile, as mentioned earlier, the authentication process is performed by the native security solution of the IPTV receiving device. Here, an execution environment of a native security solution provided in each IPTV receiving device may differ. This is because an IPTV receiving device can be designed by a different device manufacturer and therefore have a different application, a security ability value and the like.

Accordingly, in order to increase reliability of the security solution authentication, information, indicating the security level of an IPTV receiving device, is necessary. Accordingly, the concept of the security solution level can be introduced. The security solution level can refer to information in which security characteristics of devices are graded according to a preset criterion. The security solution level can be a security solution profile, indicating an execution environment of a device for security solution authentication. A device can be associated with a security solution level designated according to the security level of a security solution authentication process of the corresponding device. The preset criteria can be a security solution level table.

FIG. 7 is an exemplary view showing a security solution level table, which is a criterion for designating a security solution level of a device.

As shown in FIG. 7, the security solution level table (SSLT) can illustratively define five grades of security solution levels (SSLs).

A level 0 can refer to a security level on which authentication of the security solution authentication process and integrity check are not performed in a non-secured execution environment. A device whose security solution level is the level 0 initiates the security solution authentication process without authenticating the security solution authentication process. Accordingly, when the security solution level of a device is the level 0, it can be said that the corresponding device is a device having a very weak security. The level 0 is a level having the lowest reliability, of the defined security solution levels.

A level 1 can refer to a security solution level in which authentication of the security solution authentication process and integrity are verified using a software element of a device (for example, a software element of a native security solution) in a non-secured execution environment. The security solution authentication process at the level 1 can be initiated after being authenticated by the software element of the device. The security of the level 1 can be said to be higher than that of the above level 0.

A level 2 can refer to a level in which authentication of the security solution authentication process and integrity are directly verified using a hardware element of a device (for example, a hardware element of a native security solution) in a non-secured execution environment. The security solution authentication process at the level 2 can be initiated after being authenticated by the hardware element of the device. The security of the level 2 can be said to be higher than that of the above level 1.

A level 3 can refer to a security solution level in which authentication of the security solution authentication process and integrity are verified using a software element of a device in a secured execution environment. The security solution authentication process at the level 3 can be initiated after being authenticated by the software element of the device in the secured execution environment. The security of the level 3 can be said to be higher than that of the above level 2.

A level 4 can refer to a security solution level in which authentication of the security solution authentication process and integrity are directly verified using a hardware element of a device in a secured execution environment. The security solution authentication process at the level 4 can be initiated after being authenticated by the hardware element of the device in the secured execution environment. The security of the level 4 can be said to be higher than that of the above level 3 and have the highest reliability of the defined security solution levels.

An IPTV receiving device can have a security solution level corresponding to the above criterion according to the security level of a corresponding device. This security solution level can be inserted in a specific field within a certificate of a device and associated with the corresponding device, or can be inserted in a device profile certificate, i.e., a certificate indicating a device's security solution level and then associated with the corresponding device.

At the time of the security solution authentication process, the security solution level of an IPTV receiving device can be taken into consideration. For example, when transporting a secure download or a secure message to an IPTV receiving device as a signed content, if the security solution level of the IPTV receiving device does not fulfill a required security solution level, authentication may not be authenticated. The security solution level of the IPTV receiving device can be stored or managed in the server side or the IPTV receiving device, and a certificate including a security solution level can be issued by the server side and then stored in the IPTV receiving device.

Meanwhile, the IPTV receiving device can transport content (for example, media content, such as movies, sound source and images, and so on) and content related information (for example, license, messages, etc.), which are received from a server side, to other devices included in a domain so that the content can be shared.

For such sharing of the content, the concept of a domain is introduced. A domain is a set of authorized devices, i.e., domain devices and can refer to a range in which domain service is applicable. Content can be shared and used between domain devices included in a domain according to allowed rights.

This domain can be constructed by binding devices existing within a physical range, a logical range or a physical and logical range. In order to configure this domain, a local environment can be needed. Here, the local environment can refer to an environment in which there is provided a physical network over which devices belonging to a specific local region can operate in conjunction with each other and the physical network can also operate in conjunction with an external network.

As an example in which this local environment can be provided, there is a home network system. The home network system allows home appliances, various sensors, security devices, etc. within a home can operate in conjunction with each other over a wired or wireless local network and can also operate in conjunction with an external network, such as an Internet, through a communication node such as a home gateway. The local environment can include not only this home network system, but two or more network devices, if any, which can operate in conjunction with each other.

A region in which this local environment is provided is hereinafter referred to as a domain region. A number of devices can exist within the domain region. A user can configure a domain using the devices, and content can be shared between the domain devices.

A user can also configure a number of domains and data can be shared between the domains. For example, a user can configure one or more authorized service domains using a home network A and one or more authorized service domains using a home network B. In this case, the user can be provided with sharing service between domains by configuring a subscriber's authorized service domain including the authorized service domains.

The authorized service domains can be configured and managed by a domain manager who manages a corresponding domain. The domain manager can manage device registration with a domain, cancellation from the domain, and so on. The subscriber's authorized service domain can be configured and managed by a manager of the subscriber's authorized service domain. The manager can operate in conjunction with domain managers who manage authorized service domains, respectively, which are included in corresponding subscriber's authorized service domains.

Figure 8:
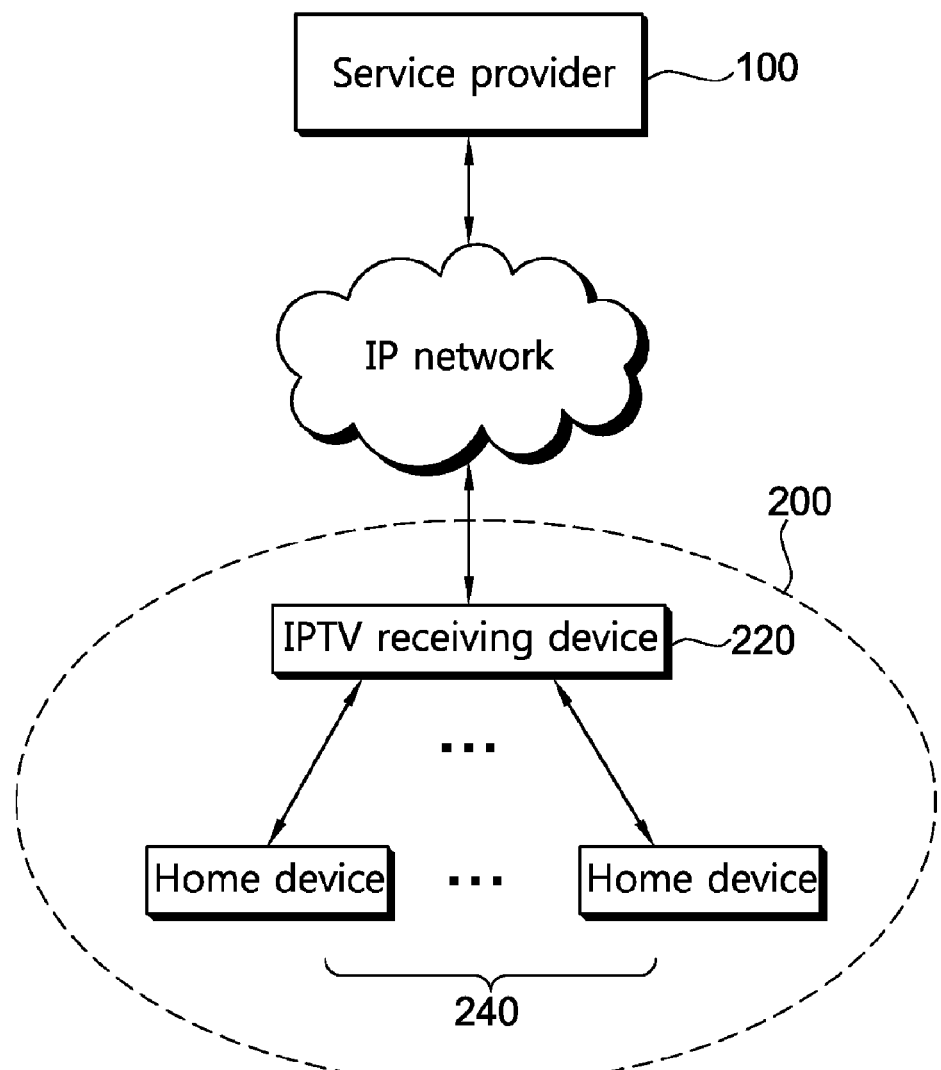
FIG. 8 is a block diagram schematically showing the configuration of a system for sharing content in an IPTV system.

FIG. 8 is a block diagram schematically showing the configuration of a system for sharing content in an IPTV system.

As shown in FIG. 8, an IPTV receiving device 220 can operate in conjunction with a service provider 100 over an IP network. Further, the IPTV receiving device 220 can operate in conjunction with home devices 240.

The IPTV receiving device 220 and the home devices 240 can join a domain 200 in order to share content. That is, the IPTV receiving device 220 and the home devices 240 can be domain devices. In order to join the domain 200, the IPTV receiving device 220 and the home device 240 can request joining the domain 200 from respective service providers 100. The service provider 100 can authenticate the corresponding devices, issue certificates to the corresponding devices, and register them with the domain 200. In the above description, an example in which the service provider 100 includes a domain manager has been described, but is not limited thereto. The domain manager may operate as a server separate from a service provider or may be included within a domain.

After the domain 200 is configured, the IPTV receiving device 220 can request content guide information from the service provider 100 and receive the content guide information therefrom. Here, the content guide information is information, guiding an itinerary, list, added information, etc. of service content and can be, for example, electronic program guide (EPG), content program guide (CPG), VoD content guide, interactive program guide (IPG) or the like.

The IPTV receiving device 220 can process the content guide information, which is received from the service provider 100, in such a way as to be compatible with a user interface and display the processed guide information. A user can select a desired content from the displayed content guide information. In response thereto, the IPTV receiving device 220 can request the selected content from the service provider 100.

In response to the request from the IPTV receiving device 220, the service provider 100 transmits the corresponding content to the IPTV receiving device 220. At this time, the service provider 100 can transmit pieces of related information, for example, security information, use rights information, revocation list information and the like, which are necessary to use the content, to the IPTV receiving device 220 together with the content.

After receiving the content, the IPTV receiving device 220 can store or play the content and can transmit the content to the home devices 240. Content can be transported between devices through various routes. For example, a secure authentication channel may be established between a device that transfers content and a device that receives content, and the content can be transported through the secure authentication channel. Alternatively, content may be transported through a storage media such as a smart card.

In order to transport content, modules, such as a domain client, a content mediator, a content exporter and a content importer, are necessary. The modules are installed at various devices. The domain client and the content exporter can be easily installed at a transmitting device, the content importer at a receiving device, and the content mediator at a transmitting device, a receiving device or a third device. However, the installation locations of the modules are not limited thereto, but may be changed in various ways according to installation environments.

Figure 9:
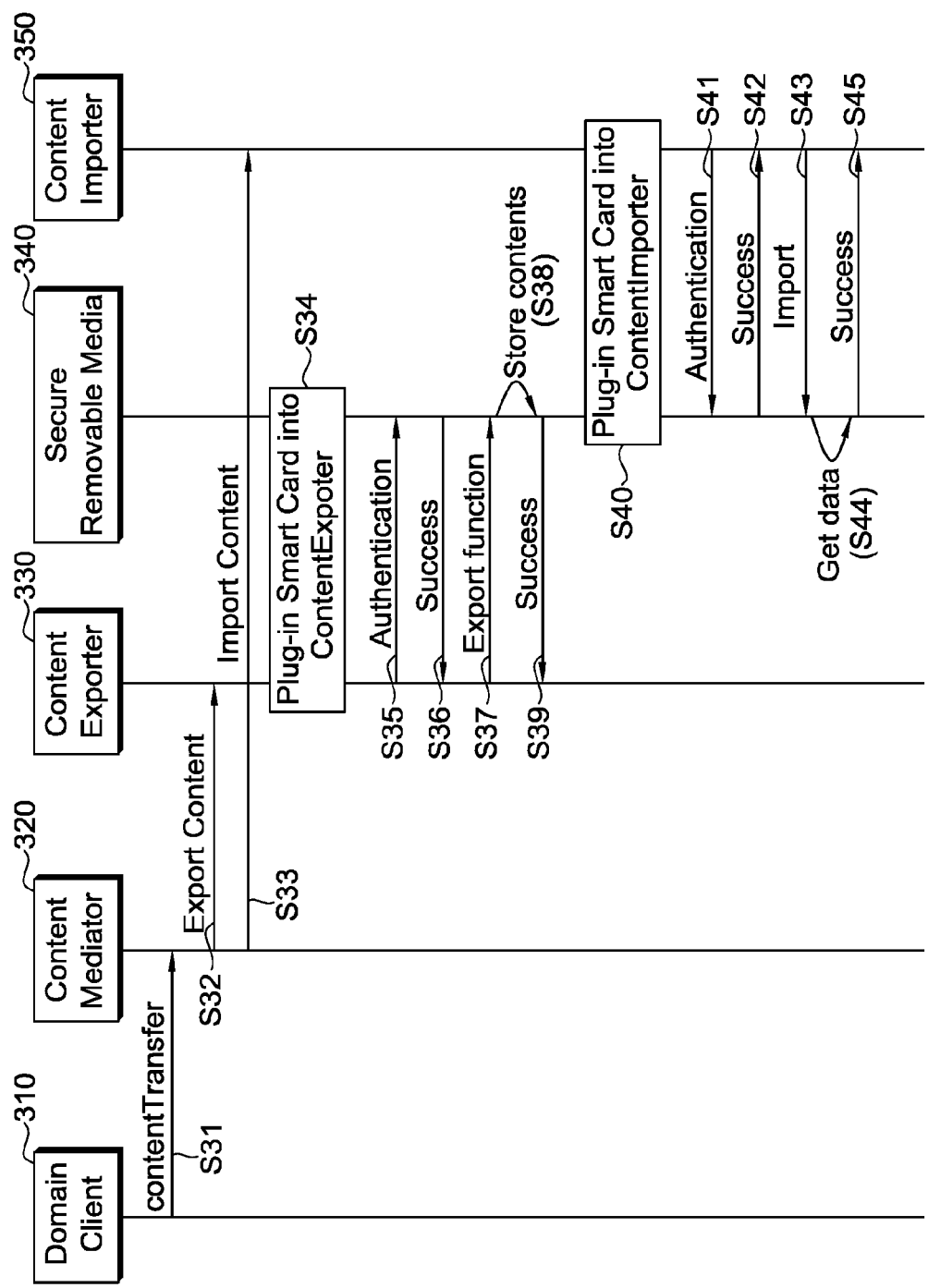
FIG. 9 is a flowchart showing a scenario to transfer content between devices through a secure removable media (SRM)

FIG. 9 is a flowchart showing a scenario to transfer content between devices through a SRM. A SRM 340 can refer to a portable media that can access a host device such as a smart card. Software modules, a certificate, etc. for supporting sharing of content are stored in the SRM.

Referring to FIG. 9, it is assumed that in this embodiment, a content exporter 330 is provided in a transmitting device and a content importer 350 is provided in a receiving device. A domain client 310 and a content mediator 320 are preferably provided in the transmitting device, but not limited thereto.

First, the domain client 310 requests the content mediator 320 to transfer content (step: S31). In response thereto, the content mediator 320 can transmit request messages, each requesting the export and import of the content, to the content exporter 330 and the content importer 350, respectively (steps: S32, S33).

Next, after the SRM 340 is inserted in the transmitting device, the content exporter 330 recognizes the SRM 340 (step: S34) and performs authentication (steps: S35, S36). An authentication mechanism can be performed in accordance with, for example, a public key infrastructure (PKI) authentication mechanism. The content exporter 330, the content importer 350, and the SRM 340 are respectively issued certificates from a trusted institute (for example, a specific entity of a server side, etc.). In the authentication procedure, mutual authentication can be performed. At the time of the authentication, identification of a device, identification of an ability value, verification of a certificate (for example, exchange of a certificate, revocation check of a certificate, etc.) and the like can be carried out. Further, at the time of the authentication, the content exporter 330 or the SRM 340 may operate in conjunction with an external on-line certificate status protocol (OCSP) server (not shown), if appropriate.

If the authentication is completed, the content exporter 330 transfers the content to the SRM 340 using an export function (step: S37). The SRM 340 stores the content (step: S38) and then transmits an acknowledge message (step: S39). Through this, the content exporter 330 can transmit the content and DRM information to the SRM 340. Accordingly, the content, which will be transported to a destination, i.e., the receiving device, is stored in the SRM 340. When transporting the content, the content exporter 330 and the SRM 340 may establish a secure authentication channel using a session key.

After the SRM 340 is plugged in the receiving device, the content importer 350 recognizes the SRM 340 (step: S40) and then performs authentication (steps: S41, S42). In the authentication procedure, identification of a device, identification of an ability value, exchange of a certificate, verification of a certificate through revocation check of a certificate, and so on can be carried out. At the time of the authentication, the content importer 350 or the SRM 340 may operate in conjunction with the OCSP server, if needed. If the authentication is completed, the content importer 350 receives and imports the content from the SRM 340 using an import function (steps: S43, S44, S45). At this time, the content importer 350 may fetch the content and DRM information from the SRM 340.

Figure 10:
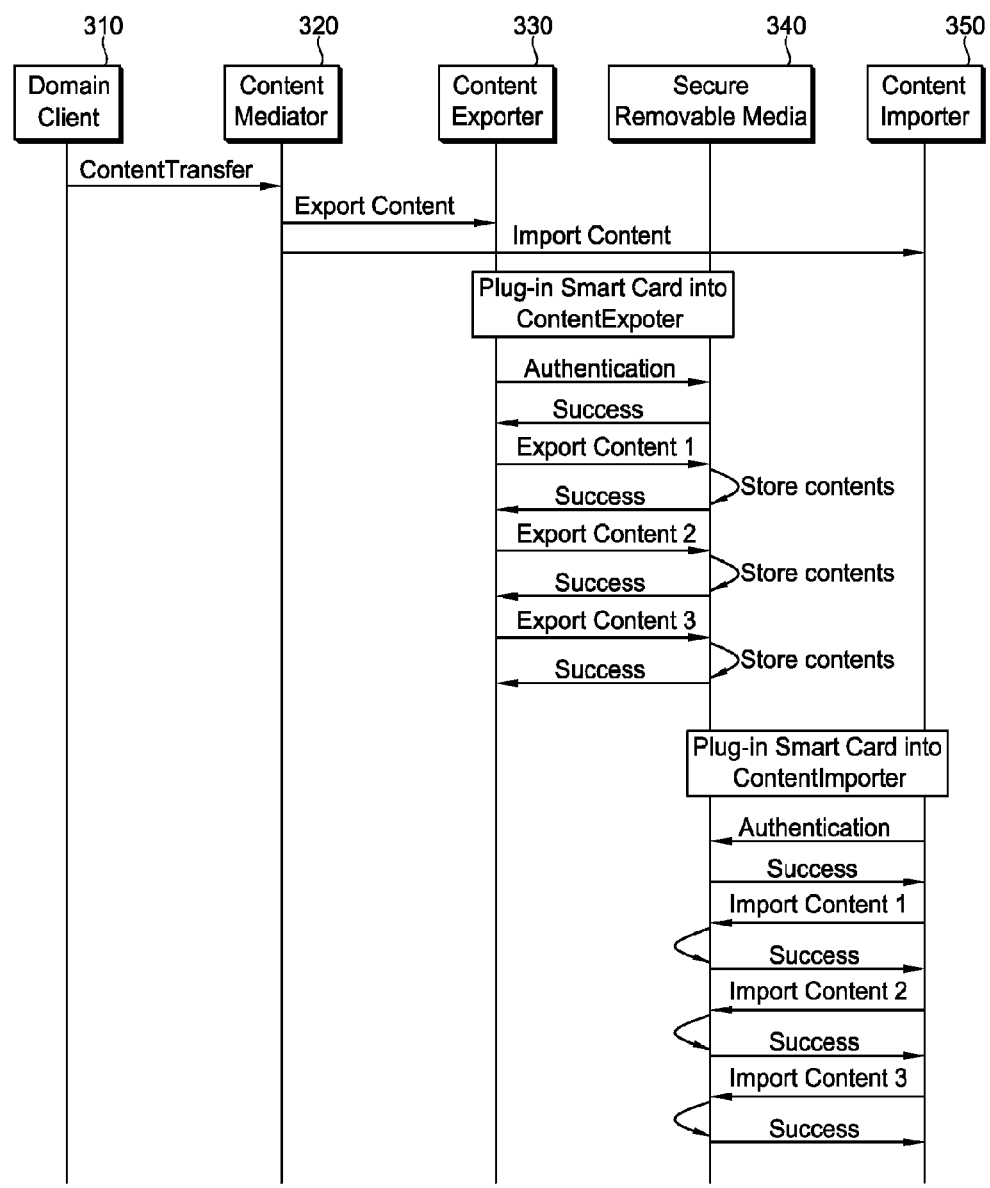
FIG. 10 is a flowchart showing a scenario to transfer plural numbers of contents between devices through the SRM.

FIG. 10 is a flowchart showing a scenario to transfer plural numbers of contents between devices through the SRM.

Referring to FIG. 10, it is assumed that in this embodiment, a content exporter 330 is provided in a transmitting device and a content importer 350 is provided in a receiving device. A domain client 310 and a content mediator 320 are preferably provided in the transmitting device, but not limited thereto.

As shown in FIG. 10, an overall transport procedure for transporting a number of contents is almost the same as that shown in FIG. 9. However, in this embodiment, since the number of contents is transferred, after authentication of the content exporter 330 and a SRM 340, the contents are sequentially transferred from the content exporter 330 to the SRM 340, and after authentication of the SRM 340 and the content importer 350, the contents are sequentially transferred from the SRM 330 to the content importer 350.

For example, the domain client 310 requests the content mediator 320 to transfer a plurality of contents. In response thereto, the content mediator 320 transmits request messages, each requesting the export and import of the plurality of contents, to the content exporter 330 and the content importer 350, respectively. If the SRM 340 is plugged in the transmitting device, the content exporter 330 recognizes the SRM 340 and then performs authentication. After the authentication is completed, the content exporter 330 sequentially transmits the contents to the SRM 340 from a first content to a last content one by one using an export function. The SRM 340 receives the contents one by one, stores the received contents, and then transmits acknowledges messages, each corresponding to the contents, to the content exporter 330. Thereafter, if the SRM 340 is plugged in the receiving device, the content importer 350 recognizes the SRM 340 and then performs authentication. After the authentication is completed, the content importer 350 can import the contents by fetching the contents from the first content to the last content one by one from the SRM 340 using an import function.

Meanwhile, the IPTV system can provide a variety of services while associating a real-time broadcast service and an on-demand service. For example, the IPTV system can provide a user who is watching a real-time broadcast with a service in which the user can be provided with a corresponding broadcast or can transfer the corresponding broadcast in the form of on-demand content, for any reason, without limit to a broadcast time.

Services that can be provided through association of the real-time broadcast service and the on-demand service have the following examples.

Scenario 1.

It is assumed that a user is watching a real-time broadcast and tries to watch a broadcast program, which is being watched, without limit to the time. The user requests a service provider to provide an on-demand content corresponding to the broadcast program that is being watched. In response thereto, the service provider provides the user with on-demand service for the corresponding content, and the user can watch the on-demand content on a desired time later on. Further, the user may immediately switch an existing service to an on-demand content service.

Scenario 2.

A user A is watching a real-time broadcast program A1 and tries to inform a user B of the broadcast program A1 that is being watched. The user A transfers information about the broadcast program A1 that is being watched and information about the user B (for example, an ID, an E-mail ID, a phone number, SMS, MMS, IMID, and so on) to a service provider. Then, the service provider transmits the information about the broadcast program A1, which is being watched by the user A, to the user B, and the user B can receive the broadcast program A1.

Scenario 3.

A bookmark function is provided to the scenario 1 or the scenario 2. For example, a service provider provides the entire broadcast, which was being watched by a user, through on-demand service, or provides an on-demand service view function in which broadcast of a portion at which a user stopped watching the broadcast can be viewed through on-demand service.

Scenario 4.

A trick mode function is provided to the scenario 1 to the scenario 3. For example, broadcast that is being watched can be moved to a desired scene or section through the trick mode or the bookmark.

Figure 11:
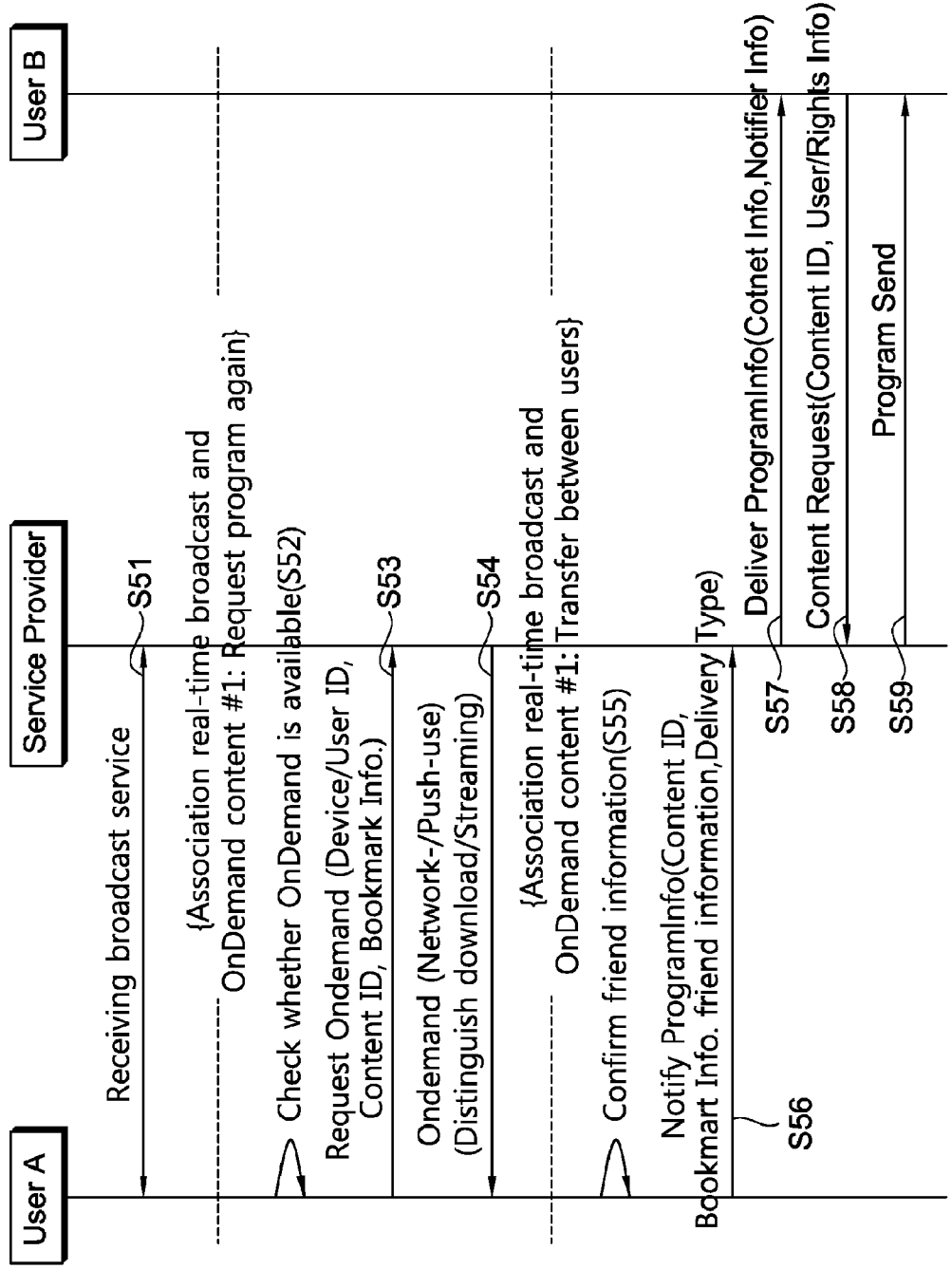
FIG. 11 is a flowchart showing an embodiment in which service is provided by associating real-time broadcast service and on-demand service.

FIG. 11 is a flowchart showing an embodiment in which service is provided by associating real-time broadcast service and on-demand service.

As shown in FIG. 11, first, a user A is receiving broadcast service from a service provider (step: S51). At this time, the user A can check whether on-demand service is available (step: S52). If, as a result of the check, the on-demand service is available, the user A can request the on-demand service from the service provider (step: S53). At the time of the request, the user A can provide the service provider with a device or user ID, a content ID, bookmark information and so on.

Then, the service provider provides the user A with the on-demand service (step: S54). At this time, whether download service or streaming service will be provided can be decided at the request of the user A, and service can be provided in form requested by the user A.

Meanwhile, the user A can confirm friend information (step: S55) and request service from the service provider in order to notify a user B of a program that is being watched (or desired) (step: S56). At this time, the user A can provide the service provider with program information (for example, a content ID, bookmark information, information of the user B, a transfer type, etc.).

The service provider delivers information of the corresponding program to the user B (step: S57), and the user B transmits the request for the program to the service provider (step: S58). In response thereto, the service provider sends the broadcast program requested by the user B to the user B (step: S59).

Meanwhile, when sharing content within a domain, a DRM interoperable system can be applied. In the DRM interoperable system, it is required to process rights information efficiently. A process of storing rights information and processing copyright expiration content in the DRM interoperable system is described below.

Constituent elements of the DRM interoperable system are described below.

Client: module included in a domain device. The client can request the DRM interoperable system to convert content and license when conversion of DRM content is necessary. In other words, the client can request content and license files, which are compatible with a DRM system of a device to which the client belongs.

Rights mediator: module for receiving license conversion request information from a client and checking authentication for the client and rights compatible with conversion request information.

Rights registry: registry that stores rights token distributed in the DRM interoperable system. The rights token is information on which license information of a plurality of native DRM systems can be extracted and functions as a medium of a license at the time of DRM interoperability. The rights token has a data structure of an intermediate XML form irrespective of various license formats of DRMs, which are owned by service providers, and functions to make different DRM license notations between different service providers compatible with each other.

DRM client: It may refer to clients of specific native DRM technologies, such as a MS-DRM client and an OMA-DRM client.

Secure DB: It may refer to a safe space for storing a license of native DRM in a client.

DRM license server: Entity that issues a license of native DRM. A license of native DRM can be issued from the DRM license server to a user device.

Application server: It may refer to a module (for example, a web page, etc.), which is implemented to sell content by a content service provider.

Authorization server: It may refer to a server that checks whether or not to purchase content (for example, rights) for a specific user.

Rights DB: It may refer to a server that stores rights information, indicating that a user has purchased content of a content service provider.

A process flow of this system is described below. First, a client A requests a DRM license appropriate for its owned DRM. The rights mediator receives the request of the client A and checks whether the client A has content use rights through a rights token stored in the rights registry. The rights registry tries to store the rights token, which has the rights information owned by the client A, of content of a service provider A. The same information as that of a native DRM license is described in usage model information, i.e., internal information of the rights token. The rights mediator can decide whether to accept a request to convert the license of the client A by checking the usage model information of the rights token stored in the rights registry.

A "DRM-disabled" attribute of the usage model information is Boolean type data, indicating whether the copyright of content corresponding to the usage module has expired. In the case of content whose copyright has expired, the "DRM-disabled" attribute has a "True" value. In the case of content whose copyright has not expired, the "DRM-disabled" attribute has a False" value. Even though it is determined that the client A does not have the use rights for the content through check of the usage model, if the "DRM-disabled" value is "True", it is determined that the client A has rights corresponding to the DRM license requested by the client A. Accordingly, an interoperable process can continue.

In the case in which the "DRM-disabled" attribute of the usage model is set to "True" when the rights token, including rights information of a user, is stored in the DB of the service provider, the rights mediator can set the user rights for a corresponding content to infinity. For example, the rights token can be stored after removing the time where the content can be executed and the number of times in which the content can be executed.

The rights mediator receives URL information on which an actual DRM license of a form requested by the client A can be obtained and transfers it to a client module of the client A. The client module transfers the received URL information to a native DRM client, and the DRM client accesses the corresponding URL.

Thereafter, the authorization server confirms the previously stored rights token again and determines whether the rights token has reasonable rights. If, as a result of the determination, the rights token has reasonable rights, the authorization server requests the DRM license server to generate a native DRM license, which corresponds to the rights stored in the DB and can be interpreted by the DRM client of the client A. The authorization server can transfer the generated license to the DRM client of the client A. The DRM client of the client A can execute the content using the transferred license.

Hereinafter, a process of storing the rights of a user in the rights registry of the DRM interoperable system using the rights injector in the case in which the user purchases a content license through a store front is described.

Figure 12:
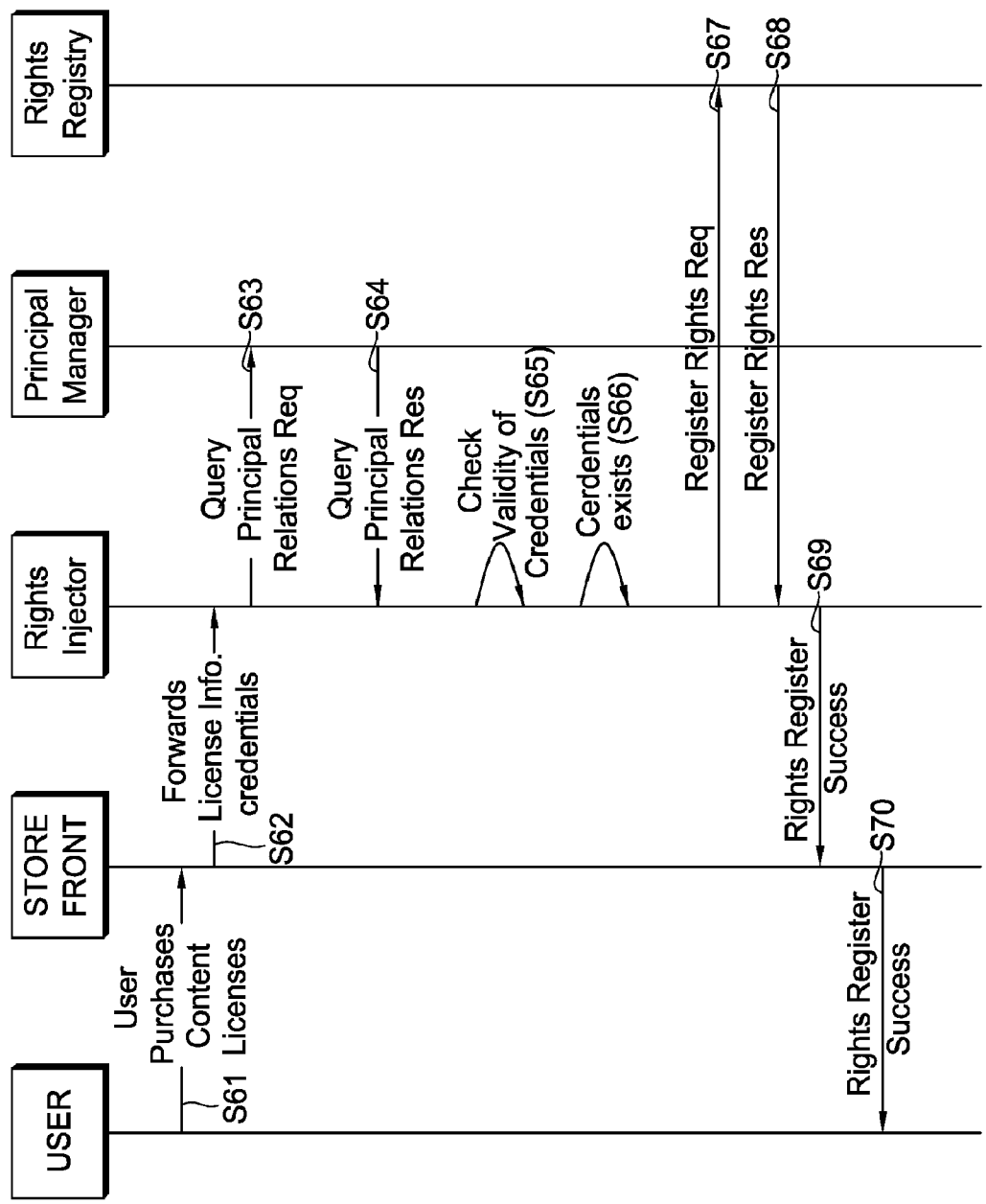
FIG. 12 is an exemplary view showing an example in which the rights of a user are stored in a rights registry using a rights injector.

FIG. 12 is an exemplary view showing an example in which the rights of a user are stored in a rights registry using a rights injector.

As shown in FIG. 12, a user purchases a license from the store front (step: S61). The store front forwards license information purchased from the rights injector and a credential (step: S62). At this time, the store front can communicate with the rights injector using a data format used in the rights injector. Preferably, the store front and the rights injector can be provided in the same box and, therefore, communication over a network is not performed. However, the present invention is not limited thereto.

After receiving the information, the rights injector queries a principal manager using a "QueryPrincipalRelations Interface" (step: S63). The principal manager verifies the credential and sends a list of principal chains, including a variety of other principals associated with the user (step: S64), to the rights injector.

The rights injector checks the validity of the credential (step: S65). If the validity of the credential is verified successfully (step: S66), the rights injector requests the rights registry to register the rights, which have been purchased by the user, therewith by calling a "RegisterRights" interface (step: S67) and receives a response from the rights registry (step: S68). At this time, if the rights have been registered successfully, the rights injector sends a message, informing that the rights have been registered successfully, to the store front (step: S69). The store front transfers the received message to the user (step: S70).

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A secure signing method, comprising:
preparing digital signature header fields and setting an attribute, wherein the digital signature header field comprises a signed data field including a certificate field and a signer information field,
the certificate field including:
a content signer certificate field in which a signer certificate appropriate for corresponding content is inserted, and
a certificate authority certificate field in which a certificate of a certificate authority is inserted,
the signer information field including:
a signer identification field including an identifier of the signer,
a digest algorithm field in which information on a hashing algorithm used to calculate a hash value of the content is inserted,
a signed attribute field in which information related to a signed attribute is inserted,
a signature algorithm field in which signature algorithm related information is inserted, and
a signature field in which a signature is inserted;
calculating the hash value of the content using the hashing algorithm;
storing the calculated hash value in a message digest field within the signed attribute field of the digital signature header;
encrypting the message digest using a secret key and putting the encrypted message digest in the signature field of the digital signature header, wherein the digital signature header is located ahead of the content; and
transmitting the content associated with the digital signature header to a device, wherein the device is associated with a security solution level profile that classifies a security characteristic of the device based on a predetermined criterion, and the device is configured to take the security solution level profile into consideration during a security solution authentication process corresponding to the content associated with the digital signature header,
wherein the security solution level profile associated with the device is included in a device profile certificate of the device and determined based on: (1) whether an execution environment for the security solution authentication process of the device is secured, or (2) whether authentication and integrity checks of the security solution authentication process of the device are verified by hardware or software, and
wherein the security solution level is at least one of: (i) a first level indicating no authentication, no integrity check and an execution environment that is non-secured, (ii) a second level indicating that authentication and integrity are verified by software on a receiving device and that the execution environment is non-secured, (iii) a third level indicating that authentication and integrity are verified by hardware on the receiving device and that the execution environment is non-secured, (iv) a fourth level indicating that authentication and integrity are verified by software on the receiving device and that the execution environment is secured, or (v) a fifth level indicating that authentication and integrity are verified by hardware on the receiving device and that the execution environment is secured.

2. The secure signing method of claim 1, further comprising:
identifying the hashing algorithm based on the information included within the digest algorithm field of the digital signature header,
wherein the signed attribute field includes a content type field in which content type information is inserted, a message digest field in which a calculated hash value is inserted, and a signing time field in which signing time information is inserted, wherein the signer certificate includes signer identification information, a public key that can be used to decrypt the encrypted message digest.

3. The secure signing method of claim 1, wherein the content is any one of non-persistent data that is used during a reception time where the content is received by the device and persistent data that is persistent within the device even after the reception time, wherein the security solution authentication process is performed in secure transport of an emergency alert system (EAS) message, secure transport of one-time commands, end-to-end communication, secure download of executable software, secure download of DRM codes, secure transport of configuration files, or update of a certificate hierarchy.

4. A secure authentication method performed by a device, comprising:

receiving content associated with a digital signature header;

checking whether a format and value of the digital signature header of the content are appropriate, wherein the digital signature header comprises a signed data field including a certificate field and a signer information field, the certificate field including:
a content signer certificate field in which a signer certificate appropriate for corresponding content is inserted, and
a certificate authority certificate field in which a certificate of a certificate authority is inserted, the signer information field including:
a signer identification field including an identifier of the signer,
a digest algorithm field in which information on a hashing algorithm used to calculate a hash value of the content is inserted,
a signed attribute field in which information related to a signed attribute is inserted,
a signature algorithm field in which a signature algorithm related information in inserted, and
a signature field in which a signature is inserted;

calculating the hash value of the content using the hashing algorithm;

comparing the calculated hash value with a message digest field within the signed attribute field of the digital signature header;

decrypting the hash value of the signature field of the digital signature header using a public key extracted from the certificate field; and comparing the decrypted hash value with the message digest, wherein the device is associated with a security solution level profile that classifies a security characteristic of the device based on a predetermined criterion, and the device is configured to take the security solution level profile into consideration during a security solution authentication process corresponding to the content associated with the digital signature header, wherein the security solution level profile associated with the device is included in a device profile certificate of the device, and determined based on: (1) whether an execution environment for the security solution authentication process of the device is secured, or (2) whether authentication and integrity checks of the security solution authentication process of the device are verified by hardware or software, wherein the security solution level is at least one of: (i) a first level indicating no authentication, no integrity check and an execution environment that is non-secured, (ii) a second level indicating that authentication and integrity are verified by software on a receiving device and that the execution environment is non-secured, (iii) a third level indicating that authentication and integrity are verified by hardware on the receiving device and that the execution environment is non-secured, (iv) a fourth level indicating that authentication and integrity are verified by software on the receiving device and that the execution environment is secured, or (v) a fifth level indicating that authentication and integrity are verified by hardware on the receiving device and that the execution environment is secured.

5. The secure authentication method of claim 4, further comprising identifying the hashing algorithm based on the information included within the digest algorithm field of the digital signature header.

6. An IPTV system comprising:

a server side system configured to calculate a hash value of content, store the calculated hash value in a message digest field within a signed attribute field of a digital signature header, encrypt the message digest using a secret key, insert the encrypted message digest into a signature field of the digital signature header, prefix the digital signature header to the content, and transfer the content to which the digital signature header is prefixed, wherein the digital signature header comprises a signed data field including a certificate field and a signer information field, the certificate field including
a content signer certificate field in which a signer certificate appropriate for the content is inserted and
a certificate authority certificate field in which a certificate of a certificate authority is inserted, the signer information field including:
a signer identification field including an identifier of the signer,
a digest algorithm field in which information of a hashing algorithm used to calculate the hash digest of content is inserted,
the signed attribute field in which information related to a signed attribute is inserted,
a signature algorithm field in which signature algorithm related information in inserted, and
the signature field in which a signature is inserted; and an IPTV receiving device configured to perform an authentication process on receiving the digital signature header, check whether a format and value of the digital signature header are appropriate, calculate a hash value of the content, compare the calculated hash value with the message digest field of the digital signature header, and decrypt the hash value of the signature field of the digital signature header using a public key extracted from the certificate field, wherein the IPTV receiving device is associated with a security solution level profile that classifies a security characteristic of the IPTV receiving device based on a predetermined criterion, and the IPTV receiving device is configured to take the security solution level profile into consideration during a security solution authentication process corresponding to the content associated with the digital signature header, wherein the security solution level profile associated with the IPTV receiving device is included in a device profile certificate of the IPTV receiving device, and determined based on: (1) whether an execution environment for the security solution authentication process of the IPTV receiving device is secured, or (2) whether authentication and integrity checks of the security solution authentication process of the IPTV receiving device are verified by hardware or software, and wherein the security solution level is at least one of: (i) a first level indicating no authentication, no integrity check and an execution environment that is non-secured, (ii) a second level indicating that authentication and integrity are verified by software on the receiving device and that the execution environment is non-secured, (iii) a third level indicating that authentication and integrity are verified by hardware on the receiving device and that the execution environment is non-secured, (iv) a fourth level indicating that authentication and integrity are verified by software on the receiving device and that the execution environment is secured, and (v) a fifth level indicating that authentication and integrity are verified by hardware on the receiving device and that the execution environment is secured.

7. The IPTV system of claim 6, wherein the server side system is configured to identify the hashing algorithm within the digest algorithm field of the digital signature header, wherein the signed attribute field includes a content type field in which content type information is inserted, a message digest field in which a calculated hash value is inserted, and a signing time field in which signing time information is inserted, wherein the signer certificate includes signer identification information, a public key that can be used to decrypt the encrypted message digest.

8. The IPTV system of claim 6, wherein the content is any one of non-persistent data that is used during a reception time where the content is received by the IPTV receiving device and persistent data that is persistent within the IPTV receiving device even after the reception time, wherein the security solution authentication process is performed in secure transport of an emergency alert system (EAS) message, secure transport of one-time commands, end-to-end communication, secure download of executable software, secure download of DRM codes, secure transport of configuration files, or update of a certificate hierarchy.

* * * * *